(12) United States Patent
Miknevich

(10) Patent No.: US 10,883,004 B2
(45) Date of Patent: Jan. 5, 2021

(54) LOW CHLORIDE PAINT DETACKIFIER

(71) Applicant: ECOLAB USA INC., St. Paul, MN (US)

(72) Inventor: Joseph Peter Miknevich, Coraopolis, PA (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 16/394,906

(22) Filed: Apr. 25, 2019

(65) Prior Publication Data

US 2019/0276687 A1 Sep. 12, 2019

Related U.S. Application Data

(62) Division of application No. 15/635,943, filed on Jun. 28, 2017, now Pat. No. 10,316,202.

(60) Provisional application No. 62/357,774, filed on Jul. 1, 2016.

(51) Int. Cl.
*C09D 7/65* (2018.01)
*C09D 7/00* (2018.01)
*C09D 7/61* (2018.01)

(52) U.S. Cl.
CPC ............ *C09D 7/65* (2018.01); *C09D 7/00* (2013.01); *C09D 7/61* (2018.01)

(58) Field of Classification Search
None
See application file for complete search history.

(56) References Cited

U.S. PATENT DOCUMENTS

| | | |
|---|---|---|
| 3,578,475 A | 5/1971 | Alexander et al. |
| 3,929,500 A | 12/1975 | Higgins |
| 4,435,308 A | 3/1984 | Thomas et al. |
| 4,564,464 A | 1/1986 | Harpel et al. |
| 4,888,386 A | 12/1989 | Huang et al. |
| 4,913,825 A | 4/1990 | Mitchell |
| 5,068,279 A | 11/1991 | Morse |
| 5,072,881 A | 12/1991 | Taube |
| 5,236,598 A | 8/1993 | Hunter et al. |
| 5,240,509 A | 8/1993 | Rey et al. |
| 5,248,440 A | 9/1993 | Mitchell et al. |
| 5,250,189 A | 10/1993 | Rey et al. |
| 5,259,976 A | 11/1993 | Bui et al. |
| 5,294,352 A | 3/1994 | Waldmann |
| 5,719,224 A | 2/1998 | Agree et al. |
| 5,836,321 A | 11/1998 | Kaneski et al. |
| 5,972,865 A | 10/1999 | Knipe, Jr. et al. |
| 6,033,525 A | 3/2000 | Moffett |
| 6,136,200 A | 10/2000 | Waldmann |
| 6,485,656 B1 | 11/2002 | Meyer et al. |
| 6,673,263 B2 | 1/2004 | Albu et al. |
| 6,858,093 B2 | 2/2005 | Albu et al. |
| 7,048,859 B1 | 5/2006 | Moffett |
| 7,338,604 B2 | 3/2008 | Wilson |
| 8,545,600 B2 | 10/2013 | Dingler et al. |
| 8,591,744 B2 | 11/2013 | Miknevich et al. |
| 9,035,043 B2 * | 5/2015 | Baik ............... C08B 31/125 536/102 |
| 2003/0026906 A1 | 2/2003 | Albu et al. |
| 2004/0084373 A1 | 5/2004 | Wilson |
| 2004/0104178 A1 | 6/2004 | Mahoney et al. |
| 2004/0217326 A1 | 11/2004 | Souter |
| 2006/0122086 A1 | 6/2006 | Albu et al. |
| 2006/0254737 A1 | 11/2006 | Anderson |
| 2010/0326923 A1 | 12/2010 | Miknevich et al. |
| 2011/0212044 A1 * | 9/2011 | Kohno ............... A61K 8/463 424/70.122 |
| 2013/0015139 A1 | 1/2013 | Guerrini |
| 2014/0053872 A1 | 2/2014 | Balent et al. |
| 2014/0251921 A1 | 9/2014 | Miknevich et al. |
| 2015/0233058 A1 * | 8/2015 | Neumann ............ C09J 11/04 162/175 |

FOREIGN PATENT DOCUMENTS

| | | |
|---|---|---|
| CN | 1919475 | 2/2007 |
| CN | 102091609 A | 6/2011 |
| CN | 102351286 A | 2/2012 |
| EP | 2365037 A1 | 9/2011 |
| JP | 52-31989 | 3/1977 |
| JP | H 06114210 | 4/1994 |
| JP | 6-509371 | 10/1994 |
| JP | H 07713 | 1/1995 |
| JP | H 0938415 A | 2/1997 |
| JP | 11-500953 | 1/1999 |

(Continued)

OTHER PUBLICATIONS

Anastas et al, sustainability through green chemistry and engineering (Year: 2002).*
International Preliminary Report on Patentability and Written Opinion for PCT/US2017/039707, dated Jan. 10, 2019, 8 pages.
Ferguson et al, a greener, halide-free approach to ionic liquid synthesis, pure appl. chem, vol. 84, No. 3, pp. 723-744 (Year: 2012).
International Search Report and Written Opinion for International Application No. PCT/US2010/039323, dated Feb. 22, 2011 (7 pages).
International Search Report for PCT/US2014/059351 dated Jan. 8, 2015.
Supplementary European Search Report for related European Application No. 10797543, dated Aug. 7, 2013 (2 pages).

(Continued)

*Primary Examiner* — Stefanie J Cohen
(74) *Attorney, Agent, or Firm* — Eric D. Babych; Barnes & Thornburg LLP

(57) ABSTRACT

The present disclosure provides a low chloride paint detackifier composition. Also disclosed are methods of making the paint detackifier composition and methods of using the paint detackifier composition. The detakifier may be made from cationized starch and sodium aluminate. The starch can be wheat starch, corn starch, tapioca starch, potato starch, rice starch, sweet potato starch, sago starch, mung bean starch, arrowroot starch, and any combination thereof.

9 Claims, No Drawings

(56) References Cited

FOREIGN PATENT DOCUMENTS

| JP | H 11672 | 1/1999 |
| JP | 2006061776 | 3/2006 |
| JP | 2007245150 | 9/2007 |
| JP | 5523207 | 6/2014 |
| JP | 6116902 B2 | 4/2017 |
| WO | WO 93/02147 | 4/1993 |
| WO | WO 96/26905 | 9/1996 |
| WO | WO 2010025810 A1 | 3/2010 |
| WO | WO 2017170234 | 10/2017 |
| WO | WO 2018005624 | 1/2018 |

OTHER PUBLICATIONS

International Search Report and Written Opinion for International Application No. PCT/US2017/039707, dated Sep. 11, 2017 (14 pages).

* cited by examiner

LOW CHLORIDE PAINT DETACKIFIER

This application is a divisional of U.S. application Ser. No. 15/635,943, filed Jun. 28, 2017, now U.S. Pat. No. 10,316,202, which claims priority to U.S. Application No. 62/357,774 filed Jul. 1, 2016, the entire disclosures of which are incorporated herein by reference.

TECHNICAL FIELD

The present disclosure relates generally to paint detackifiers, such as low chloride-containing detackifiers.

BACKGROUND

The spray painting of automobile bodies, engines and a variety of industrial and consumer articles is carried out in specialized enclosures called paint spray booths. These booths provide a controlled work area for the painting operations that enhances worker safety and minimizes the amount of contaminants that adversely impact a finished paint job. Booths can vary significantly in size and design. The booths have a work area where the actual painting is done and a backsection/underbooth area where paint overspray is removed from the air. In small or low production systems, this is accomplished by pulling the paint laden air through a series of disposable filters. More commonly, a moving stream of air generated by booth exhaust fans pulls the paint overspray through a curtain or spray of recirculating water effectively scrubbing the paint particles from the air into a water or aqueous phase for recovery or processing. The water and scrubbed paint particles are carried to a sump basin where the paint particles are separated from the water so that the water can be recycled, and the safe deposal of waste paint solids.

Paint is a highly adhesive film forming material. It tends to readily adhere to any exposed surface, including the interior of the spray booth where it can build up and eventually reduce air and water flow, block drains, damage pumps and plug screens. This reduces booth efficiency and significantly increases operating costs. For this reason, chemical "detackifiers" are usually added to the recirculating water. These detackifiers improve the scrubbing efficiency of the booth, prevent the paint from adhering to booth surfaces, and aid in the collection and removal of paint solids from the recirculating water stream.

Conventionally, solvent-based or solvent borne paints were most commonly employed in spray booths. More recently, increased environmental awareness has resulted in regulations limiting the amount of volatile organic compounds (VOCs) that can be released. This has resulted in an increased use of waterborne paints and reformulation of existing solvent based ones to reduce VOCs. These materials, while not as tacky as solvent based materials, are much more difficult to separate from water and due to their surfactant load are much more prone towards generating significant amounts of foam and require different treatments than their solvent based analogs. Consequently, a need has developed for detackifiers that cannot only reduce the stickiness of traditional paints but also deal with the need to control foam and improve collection of newer, reformulated water based and hazardous air pollutant (HAP) compatible solvent based paints (ones determined not to contain any materials regulated as HAPs).

Current economic concerns and environmental awareness have also dictated that these products be cost effective and perform in a sustainable manner. Moreover, due to long term corrosion concerns, several manufacturers have begun placing restrictions on the amount of chlorides that a product can contain or the amount of chloride that can be present in the paint sludge systems. As a result, there is an increasing need to provide detackifiers that do not result in chloride accumulation in the environment to meet these environmental sustainability goals.

BRIEF SUMMARY

In some aspects of the present disclosure, a composition for detackifying paint is disclosed. The composition includes a cationized starch and a solution of sodium aluminate, where the concentration of chloride in the composition is less than or equal to about 30,000 ppm.

In some embodiments, the sodium aluminate is derived from membrane grade or diaphragm grade caustic soda. In some embodiments, the sodium aluminate is derived from membrane caustic soda. In certain embodiments, the composition has less than about 100 ppm chloride concentration. In some embodiments, the sodium aluminate is derived from diaphragm caustic soda. In at least one embodiment, the composition has less than or equal to about 6000 ppm chloride concentration.

In some embodiments, the cationized starch is selected from cationized wheat starch, corn starch, tapioca starch, potato starch, rice starch, sweet potato starch, sago starch, mung bean starch, arrowroot starch, and any combination thereof. In certain embodiments, the cationized starch is cationized corn starch. In some embodiments, the cationized corn starch is cationized with a cationizing agent containing trimethyl ammonium bromide.

In some embodiments, the composition has less than about 20 ppm chloride concentration. In particular embodiments, the composition has less than about 4 ppm chloride concentration.

In some embodiments, the sodium aluminate solution is between about 38% and about 45% active. In some embodiments, the amount of cationized starch constitutes about 25 to about 50%, by weight, of the composition. In certain embodiments, the amount of sodium aluminate constitutes about 50 to about 75%, by weight, of the composition.

The present disclosure also provides a method of detackifying paint. The method includes providing any of the aforementioned compositions to a flow stream of a circulating water system, which comprises paint overspray. In some embodiments, the method includes adjusting a pH of the circulating water system between about 6 and about 10. In some embodiments, the method includes separating detackified paint from the circulating water system.

In other aspects, a method of preparing a composition for detackifying paint is disclosed. The method includes heating starch to form a starch solution, adjusting the pH of the starch solution to a value greater than about 12, adding a cationizing agent, heating the starch solution with the cationizing agent, and adding a solution of sodium aluminate.

In some embodiments, the sodium aluminate is derived from membrane grade or diaphragm grade caustic soda. In some embodiments, the composition has less than or equal to about 6000 ppm chloride concentration. In certain embodiments, the composition has less than about 50 ppm chloride concentration. In particular embodiments, the starch is selected from wheat starch, corn starch, tapioca starch, potato starch, rice starch, sweet potato starch, sago starch, mung bean starch, arrowroot starch, and any combination thereof. In some embodiments, the starch is corn starch. In some embodiments, the starch is cationized with a cationizing agent containing trimethyl ammonium bromide.

DETAILED DESCRIPTION

Unless expressly stated to the contrary, use of the term "a" is intended to include "at least one" or "one or more." For example, "a composition" is intended to include "at least one composition" or "one or more compositions."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety.

A composition for treating oversprayed paint is disclosed. The composition includes a solution of cationized starch and sodium aluminate having a total chloride concentration less than or equal to about 30,000 ppm chloride. In an embodiment, the composition will contain less than or equal to about 100 ppm of chloride. The composition is particularly useful as a liquid concentrate that can be added to recirculating water systems in paint spray booths to treat both solvent-borne (SB) and water-borne (WB) paints.

Typically, sodium aluminate and starch are incompatible. If, however, the pH of the starch is not neutralized after it is cationized, the cationized starch surprisingly blends with sodium aluminate. Cationization of the starch is accomplished by heating the starch for greater solubilization followed by increasing the pH of the starch prior to cationization. A cationizing agent is added that forms an epoxide intermediate which then reacts with the starch. To make a stable detackifying agent, the pH of the cationized starch must be close to that of the sodium aluminate. This is usually accomplished during the initial pH adjustment but may be also adjusted further after cationization.

In some embodiments, the cationic starch has a degree of substitution of about 0.01 to about 1.0%.

A method of preparing the aforementioned compositions is also disclosed. The method includes heating starch granules to form a fluidic starch solution. The method may include mixing the starch granules with water to form a starch solution. The pH of the starch solution is adjusted to a value greater than about 12, after which a cationizing agent is added. The resulting solution is heated to form the cationized starch. Following cationization of the starch, sodium aluminate is added. Water can be removed by various techniques, such as evaporation, to form a concentrate.

A method of using the aforementioned composition is also disclosed. The method is particularly applicable to treating water systems containing paint. In some embodiments, the method treats oversprayed paint particles in a circulating water system. The method detackifies paint from a circulating water system or any other type of aqueous paint capture system. In such methods, oversprayed paint is contacted with a water system. In some embodiments, the water system contains the aforementioned compositions before the oversprayed paint is captured in the water system. In some embodiments, the aforementioned compositions are added to the water system containing oversprayed paint. The compositions act to detackify and flocculate oversprayed paint particles. The method may also include a step of separating the treated oversprayed paint particles from the water.

Sodium aluminate is available from a number of commercial sources as a reaction product by the dissolution of aluminum hydroxide in a caustic soda. Aluminum hydroxide (gibbsite) can be dissolved in, for example, about 20 to about 25% aqueous NaOH solution at a temperature near the boiling point. In some embodiments, the grade of caustic soda is membrane grade or diaphragm grade. The grade of caustic soda is determined by the soda's preparation. Caustic soda prepared in an electrolytic process with brine in a membrane cell results in membrane grade caustic soda. Caustic soda prepared in an electrolytic process with brine in a diaphragm cell results in diaphragm grade caustic soda. Thus, in some embodiments, the caustic soda is membrane grade, and in some embodiments, the caustic soda is diaphragm grade. In certain embodiments, the sodium aluminate may be made from both membrane and diaphragm grades of caustic soda.

The major difference in the two grades is the amount of starting material (sodium chloride) remaining in the final product. Membrane grade caustic soda will have less than about 0.01% (100 ppm) of the sodium chloride remaining in the product. Diaphragm grade material will have less than about 1.2% (12,000 ppm) sodium chloride.

The sodium aluminate, when added to the cationized starch, should have an activity level between about 38% and about 45%.

Starch, sometimes referred to as amylum, is a polysaccharide carbohydrate having a large number of glucose units joined together by glycosidic bonds. Starch is produced by green plants as an energy store and is a major food source for humans. Pure starch is a white, tasteless and odorless powder that is insoluble in cold water or alcohol. It includes two types of molecules: the linear and helical amylose and the branched amylopectin. Depending on the plant, starch generally contains about 20 to about 25% amylose and about 75 to about 80% amylopectin.

A number of different starch sources may be used to provide the starch in the aforementioned compositions. One form of starch is corn starch but, in some embodiments, the starch can be any one of wheat starch, corn starch, tapioca starch, potato starch, rice starch, sweet potato starch, sago starch, mung bean starch, arrowroot starch, and any combination of the foregoing starches. In some embodiments, the starch is a mixture of any two of the aforementioned starches. In some embodiments, the starch is a mixture of any three or more of the aforementioned starches.

The starches may be cationized by conventionally known processes. Such processes provide starch in caustic, an aqueous solution and a cationizing agent. The chosen starch or starch mixture should have an effective degree of substitution. The degree of substitution of a cationic starch is described by the average number of substituents per anhydroglucose unit and has a potential maximum value of three. The cationization process produces a polymer having a strong positive charge that improves solubility and permits interaction with negatively charged surfaces. The process also adds an amine functionality to the existing hydroxyl functionality, lending itself to reactive chemistry on either side group. The cationic starch used has a degree of substitution between about 0.01 and about 1.0, making it suitable for use as a flocculant. It is provided as an aqueous solution of about 1 to about 35% solids. Suitable products are available commercially from Dober, Alco or ISC, for example.

In some embodiments, the cationized starch has the following generalized structure:

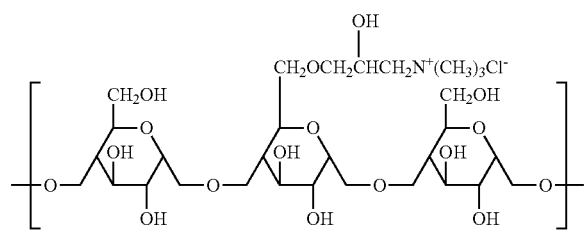

The structure is included for informational purposes only and does not consider any branching that may occur off the original amylose unit.

In some embodiments, the cationized starch has the following generalized structure:

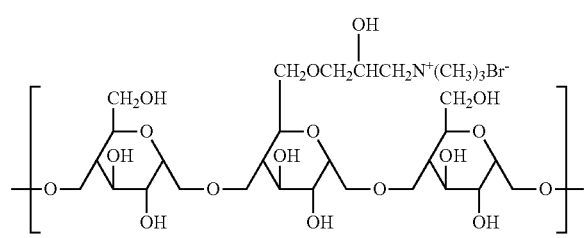

The structure is included for informational purposes only and does not consider any branching that may occur off the original amylose unit. In some embodiments, the starch is cationized with a cationizing agent containing trimethylammonium bromide.

Other materials that could be cationized and may provide similar performance include guar gum, gum Arabic, hydroxyethyl cellulose, hydroxypropyl cellulose and methylcellulose gum.

Examples of cationizing agents include N-(3-chloro-2-hydroxypropyl) trimethylammonium chloride or N-(3-bromo-2-hydroxypropyl)trimethylammonium bromide.

In some embodiments, the amount of cationized starch in the composition is from about 25 to about 50%, by weight. In some embodiments, the amount of sodium aluminate is between about 50% and about 75%, by weight.

The composition may also include a natural or synthetic polymeric flocculant containing at least about 0.1% hydroxyl functionality and a molecular weight of at least about $2.5 \times 10^5$ Daltons. The polymer should be easily biodegradable and be capable of reacting with a complex polymeric salt of an amphoteric metal to form a crosslinked gel at neutral or alkaline pH values. Suitable products include polymers (or copolymers, terpolymers, etc.,) of synthetic polymers, such as acrylamide, or natural polymers, such as chitosan or guar gum.

Additionally, other polymeric compounds may be utilized in conjunction with the compositions disclosed herein to act as co-flocculants and facilitate more rapid separation of the paint solids from the recirculating water system. For example, high molecular weight polymers of acrylamide may be added. These would include copolymers containing amine or hydroxyl functional groups.

When the aforementioned compositions are prepared as a liquid concentrate, that concentrate can then be added to the recirculating water system of a paint spray booth for use as a primary detackifying additive and/or coagulating additive for oversprayed paint solids. Use concentrations in such systems would typically be in the range of about 10 to about 1000 ppm, based on water flow and paint loading.

In use, the pH of the recirculating water system can be maintained between about 6 and about 10. In some embodiments, the pH of the recirculating water system can be maintained between about 7 and about 9. Since the composition of the present disclosure is already caustic in some embodiments, its use may influence the pH of the recirculating water system by increasing the pH of the water system.

In some embodiments, the detackifying compositions can be fed to the recirculating water system of a paint booth. The paint overspray contacts the recirculating water of the booth scrubber section. In contacting the water containing the detackifier composition, the paint overspray becomes rapidly detackified and coagulated, causing it to separate from the system water as a sludge layer. Additional components may optionally be added to help separate the coagulated paint sludge with liquid-solid separation techniques. Optional equipment may also be used, such as floatation units, centrifuges and skimmers.

The amount of chloride present in the compositions can vary depending on the grade of caustic soda used to prepare the sodium aluminate included in the composition, as well as the cationizing agent used to cationize the starch. In some embodiments, the amount of chloride present in the detackifying composition is equal to or less than about 30,000 ppm. In some embodiments, the amount of chloride present in the detackifying composition is equal to or less than about 25,000 ppm. In certain embodiments, the amount of chloride present in the detackifying composition is equal to or less than about 6,000 ppm. In certain embodiments, the amount of chloride present in the detackifying composition is equal to or less than about 100 ppm. In particular embodiments, the amount of chloride present in the detackifying composition is equal to or less than about 40 ppm, about 25 ppm, about 20 ppm, about 5 ppm, or about 4 ppm.

Applicant has surprisingly discovered that unlike other starch or starch-modified materials, the aforementioned compositions can be supplied and used substantially free of antimicrobial additives, thus avoiding the use of such materials. Applicant has also surprisingly found that the aforementioned compositions, because of their alkalinity, can be used in water systems without the need of additional alkalinity agents to maintain and operate the recovery and reclamation systems.

Certain embodiments of the present disclosure are illustrated by the following examples, which are not intended to limit the disclosure or claims of the present application.

EXAMPLES

Example A 240 grams of ISC 11043 cationic starch were added to a stirred 2.0 liter container. 40 grams of R-3356 (membrane grade sodium hydroxide) was added to adjust the pH to approximate that of the sodium aluminate. The solution was thoroughly mixed, and 720 grams of membrane grade sodium aluminate (Remondis SE & Co. KG Lunin, Germany) was rapidly added and the solution stirred until uniform. The chloride content of the final product was measured to be less than 30 ppm.

Example B 240 grams of ISC 2500N cationic starch (non-neutralized) is added to a stirred 2.0 liter container. 40 grams of R-155 (diaphragm grade sodium hydroxide) was added to adjust the pH of the starch to approximate that of the sodium aluminate. The solution was thoroughly mixed, and 720 grams of Nalco 2 (diaphragm grade sodium aluminate USALCO Baltimore, Md.) was rapidly added and the solution stirred until uniform. The chloride content of the final product was measured to be between 7000-10,000 ppm.

The compositions of the present disclosure have been shown to provide effective treatment for a wide variety of commercially available automotive paints. These can be further categorized as latexes, enamels, alkyds and lacquers.

To demonstrate the effectiveness of the compositions, the following procedure was employed. For each test, 200 ml of cold tap water was added to an open mouth, one-pint glass jar equipped with a magnetic stir bar. While stirring at high speed, 0.2 ml of the product to be evaluated was added to the jar and the pH adjusted to 8-9 with caustic if needed. As stirring continued, 10-12 drops (0.5 ml) of a mixture of commercially available automotive paints was added to the vortex. The samples were mixed for 30 seconds, then 1.5 ml of a 1% solution of Nalco 7768 were added to facilitate separation of the paint solids and allowed to mix for an additional 30 seconds after which time the mixer was turned off. After allowing the sample to stand for 30 seconds, the samples were evaluated for tackiness and final water quality. Separate tests were run for each composition utilizing mixtures of solvent borne (SB) basecoats and water borne (WB) basecoats, respectively.

The following information was observed to evaluate the effectiveness of Example A.

TABLE I

| Paint | Tack | Smear | Sludge Appearance | Water clarity (ntu) |
|---|---|---|---|---|
| SB Blend | None | None | Fluffy | Good 7.9 |
| WB Blend | None | None | Fluffy | Good 9.8 |

The following information was observed to evaluate the effectiveness of Example B.

TABLE II

| Paint | Tack | Smear | Sludge Appearance | Water clarity (ntu) |
|---|---|---|---|---|
| SB Blend | None | None | Fluffy | Good 10.2 |
| WB Blend | None | None | Fluffy | Good 12.6 |

Corrosion studies were also run comparing the performance of Example A with a variety of commonly used detackification chemicals to demonstrate the benefit of the reduced chloride content. In each case, 12.0 g of product was added to 500 ml of water, and the pH adjusted to a nominal value of 8.3 with stirring. After 30 minutes, any precipitate was filtered out, and mild steel corrosion coupons mounted in the liquid. After stirring for 15 days at constant pH, the coupons were removed and corrosion rates determined in mils per year (mpy). The composition provided as Example A showed significantly lower corrosion rates than any of the other products tested. The results are shown in Table III. AM refers to acrylamide; DADMAC refers to diallyl dimethyl ammonium chloride; ACH refers to aluminum chlorohydrate; AM/DADMAC/ACH refers to a copolymer of those materials.

TABLE III

| Chemistry/Name | Corrosion mpy |
|---|---|
| Polyaluminum nitrate | 9.1 |
| Hectorite | 3.4 |
| Melamine formaldehyde | 11.7 |
| Sodium aluminate | 1.4 |
| Polyaluminum chloride | 9.5 |
| AM/DADMAC/ACH | 17.1 |
| Cationic starch/ACH | 15.9 |
| Example A | 0.9 |
| Blank - water | 7.0 |

What is claimed is:

1. A method of preparing a composition for detackifying paint, comprising:
   heating starch to form a starch solution;
   adjusting a pH of the starch solution to a value greater than about 12;
   adding a cationizing agent;
   heating the starch solution containing the cationizing agent to produce a solution of cationized starch; and
   adding a solution of sodium aluminate,
   wherein the composition comprises a concentration of chloride less than or equal to about 30,000 ppm.

2. The method of claim 1, wherein the sodium aluminate is derived from membrane grade or diaphragm grade caustic soda.

3. The method of claim 1, wherein the composition comprises less than about 6000 ppm chloride.

4. The method of claim 1, wherein the composition comprises less than about 100 ppm chloride.

5. The method of claim 1, wherein the starch is selected from the group consisting of wheat starch, corn starch, tapioca starch, potato starch, rice starch, sweet potato starch, sago starch, mung bean starch, arrowroot starch, and any combination thereof.

6. The method of claim 1, wherein the starch is cationized with a cationizing agent containing trimethyl ammonium bromide.

7. The method of claim 1, wherein a pH of the cationized starch solution is at a value of greater than about 12.

8. A method of preparing a composition for detackifying paint, comprising the steps of:
   heating starch to form a starch solution;
   adjusting a pH of the starch solution to a value greater than about 12;
   adding a cationizing agent;
   heating the starch solution containing the cationizing agent to produce a solution of cationized starch; and
   adding a solution of sodium aluminate to the solution of cationized starch,
   wherein a pH of the cationized starch solution is at a value of greater than about 12 prior to the step of adding a solution of sodium aluminate.

9. A method of preparing a composition for detackifying paint, comprising:
  heating starch to form a starch solution;
  adjusting a pH of the starch solution to a value greater than about 12;
  adding a cationizing agent;
  heating the starch solution containing the cationizing agent to produce a solution of cationized starch; and
  adding a solution of sodium aluminate,
  wherein the sodium aluminate is derived from membrane grade or diaphragm grade caustic soda.

* * * * *

UNITED STATES PATENT AND TRADEMARK OFFICE
CERTIFICATE OF CORRECTION

| | | |
|---|---|---|
| PATENT NO. | : 10,883,004 B2 | Page 1 of 1 |
| APPLICATION NO. | : 16/394906 | |
| DATED | : January 5, 2021 | |
| INVENTOR(S) | : Joseph Peter Miknevich | |

It is certified that error appears in the above-identified patent and that said Letters Patent is hereby corrected as shown below:

On the Title Page

Item [57], Line 4, delete "detakifier" and insert -- detackifier --.

In the Specification

Column 1, Line 6, delete "filled" and insert -- filed --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*